J. B. SALMON.
PROCESS OF MANUFACTURING PNEUMATIC TIRES.
APPLICATION FILED SEPT. 20, 1915.

1,219,163.

Patented Mar. 13, 1917.

Witnesses:
M. E. McHale
C. S. Kesler

Inventor
John B. Salmon
by
James L. Norris
Attorney

UNITED STATES PATENT OFFICE.

JOHN BOURKE SALMON, OF DUNEDIN, NEW ZEALAND.

PROCESS OF MANUFACTURING PNEUMATIC TIRES.

1,219,163.

Specification of Letters Patent.

Patented Mar. 13, 1917.

Application filed September 20, 1915. Serial No. 51,684.

*To all whom it may concern:*

Be it known that I, JOHN BOURKE SALMON, of Filleul street, in the city of Dunedin, in the British Dominion of New Zealand, inventor, have invented certain new and useful Improvements in Processes of Manufacturing Pneumatic Tires; and I do hereby declare that the following is a full, clear, and exact description of the invention, such as would enable others skilled in the art to which it belongs to make and use the same.

The present invention relates to the manufacture of pneumatic tires, and it comprehends, briefly, a process for strengthening and generally improving the construction of the tire by employing, as a component part thereof, a member which consists of one or more strips or pieces of chrome leather, and which is interposed between, and united to, the usual tread and lining portions of the tire.

According to the invention, the chrome leather is utilized in that condition or stage of its tanning, known to the trade as "pyrotan," in which it is still wet, soft, pulpy and most pliable, and before it is dried and becomes the chrome leather of commerce. While in such condition, the leather is stretched over a mold-block or former, around which it can readily be fitted without wrinkling merely by pressing or otherwise working it into place, thus avoiding the necessity of cutting away V-shaped portions of the leather, as must ordinarily be done. As the fitting or shaping proceeds, the edges of the leather are tacked to the block, and at the completion thereof the leather is clamped in place by metal rings, which are also used to form the beads, and left to dry upon the block. After having been dried in this way, the molded strip is detached, and roughened upon both faces with a rasp or file, and is then successively degreased and thoroughly saturated with rubber solution. It is next secured to the usual canvas lining, after which, rubber tread-stock is applied to its outer surface, and finally the entire body thus formed is subjected to vulcanization in a dry heat.

In the accompanying drawing:—

Figure 1:
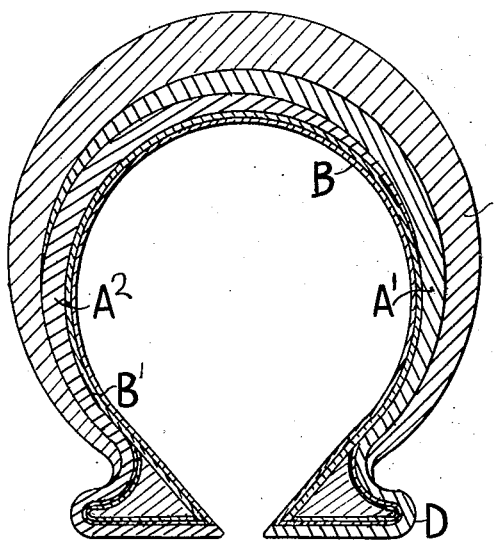
Figure 1 is a cross-sectional view of a tire constructed with a two-piece leather strip.
Figure 2:
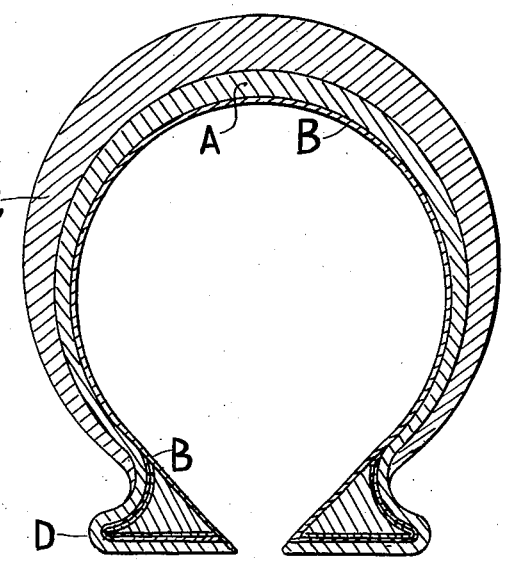
Fig. 2 is a view similar to Fig. 1, but showing a one-piece leather strip.

Referring to said drawing, and more particularly to Figs. 1 and 2 thereof, the tire will be seen to comprise an outer or tread portion C, constructed of rubber stock; an inner portion or lining of canvas, which may consist of a single thickness B, (Fig. 2), or two thicknesses B, B', (Fig. 1), both of said portions being of more or less conventional form; and an intermediate portion of leather, which embodies the principal features of the invention. This intermediate portion may likewise consist, either of a single strip, indicated at A in Fig. 2, or of two separate strips A' and A², (Fig. 1), said strips A', A², being connected together, as hereinafter described. D indicates the usual beads, which will vary for different makes or styles of tires.

Figure 3:
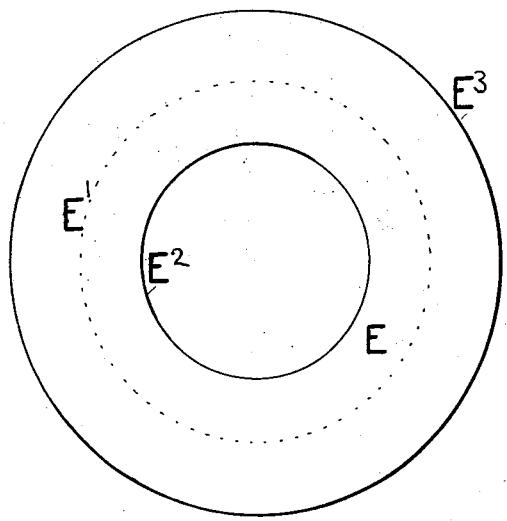
Fig. 3 is a plan view, on a smaller scale, of an annular leather strip or blank.
Figures 4, 5:
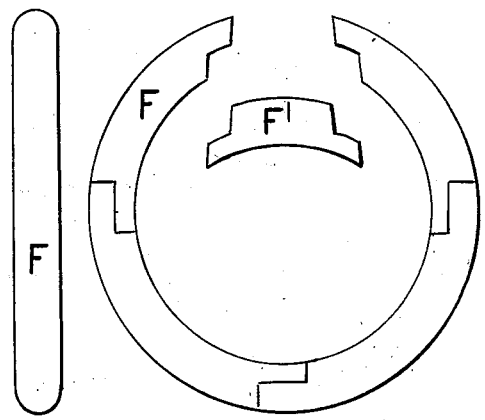
Fig. 4 is an edge view of the mold-block or former.
Fig. 5 is a side elevation of a collapsible mold-block.

In constructing the tire, the soft, wet and pulpy leather, in the form of an annular, or substantially-annular, blank E, (Fig. 3), is first stretched over an annular mold-block F, (Figs. 4 and 5), which is, or may be, collapsible, comprising, in such instance, an inwardly-removable key-piece F'. This stretching operation is continued until the center line E' of the blank practically coincides with that of the tread of the block throughout its entire extent. The smaller or inner edge E² of the blank is then easily made to fit the block, and the larger or outer edge E³ is very carefully drawn over and worked in until it fits the block without puckering, the edges being tacked in position as the work proceeds. The beads are next formed by means of suitable metal rings or clamps, (not shown), and the blank is then allowed to dry on the block, preferably in a warm room. At the conclusion of the drying operation, the molded blank, which, by that time, is entirely devoid of wrinkles, is removed from the block, degreased, and roughened upon both surfaces to form a nap; after which, it is thoroughly saturated and coated with rubber solution. The usual canvas casing or lining, which may have either one or two thicknesses B, B', as previously stated, and which is formed with beads, as is customary, is then saturated with the rubber solution, and the usual rubber cushion-stock is then applied thereto. The lining, with its covering of stock, is next placed against the inner face of the saturated leather blank, and a sufficient quantity of rubber tread-stock is then applied to the outer face of said blank, and the entire body thus formed is finally vulcanized in metal molds heated by steam at a pressure of about fifty pounds per square inch.

Substantially the same steps are followed when the leather strengthening portion or member consists of two separate strips or pieces A', A², (Fig. 1), instead of the single strip or piece A, (Fig. 2); and it may here be stated that the two-piece construction is necessary when the hides are not large enough for certain sizes of tires, or are not quite perfect throughout. In carrying out the process with the two-piece construction, both pieces are stretched on being applied to the mold-block in the manner above described, and are otherwise subjected to the same treatments as the single strip or blank, with the addition that they are thinned at the proper points to form the long, overlapping skived joints represented in Fig. 1, and have their juxtaposed inner faces united by rubber cushion stock, as will be understood. Also, in this case, the center lines of the two strips will be disposed slightly to opposite sides of the center line of the tread.

I claim—

1. The herein-described process of making pneumatic tires, which consists in successively stretching soft, wet, pulpy leather over a mold-block so that the center line of the body of said leather substantially coincides with that of the tread of the mold-block; working the leather over the mold-block, so as to fit the same without puckering, and tacking it to said block as the fitting proceeds; forming beads on the edges of the leather thus shaped; drying it, and subsequently degreasing and roughening it on both faces to form a nap thereon; saturating the roughened faces with a rubber solution; applying canvas to the inner face of the leather, and rubber tread-stock to the outer face thereof; and vulcanizing the whole together in a dry heat.

2. The herein-described process of making pneumatic tires, which consists in successively stretching rings of soft, wet, pulpy chrome leather over a mold-block from opposite sides thereof; trimming and fitting the smaller sides or circumferences of said rings to the mold-block, and working in the larger sides or circumferences of the rings to prevent puckering, and securing the latter sides to said mold-block as the fitting proceeds; forming beads on the edges of the leather thus shaped, and subsequently drying it; degreasing and roughening the leather to bring up a nap on the faces thereof; saturating the leather with a rubber solution; applying canvas to the inner face of the leather, and rubber tread-stock to the outer face thereof, and finally vulcanizing the whole together in a dry heat.

In testimony whereof, I have hereunto set my hand in the presence of two subscribing witnesses.

JOHN BOURKE SALMON.

Witnesses:
HENTON MACAULAY DAVEY,
W. B. WHANE.